Feb. 21, 1967   L. J. ZADARNOWSKI   3,304,653
FERTILIZING MEANS
Filed Aug. 14, 1964

LUDWIK J. ZADARNOWSKI
INVENTOR.

BY
LeRoy J. Leishman
AGENT

United States Patent Office 3,304,653
Patented Feb. 21, 1967

3,304,653
FERTILIZING MEANS
Ludwik J. Zadarnowski, 528 Grace Ave.,
Inglewood, Calif. 90301
Filed Aug. 14, 1964, Ser. No. 389,558
6 Claims. (Cl. 47—48.5)

The invention herein described pertains to fertilizing equipment, and more particularly to sealed devices to be completely buried in the ground or completely immersed in water for fertilizing plants that are wholly or in part below the surface of the water or the ground.

Most people, especially housewives, do not usually obtain the expected results when they attempt to fertilize potted and other plants, or plants that are placed in aquariums. If the fertilizing chemicals are dissolved in the water used on the potted plants, the plants are usually overfertilized, and when chemicals intended for fertilization are placed in the water in aquariums, the water often sours and the fish frequently die.

One object of the present invention is to supply means that will release the fertilizing chemicals over a period of several hours or days, thus obviating the aforementioned difficulties.

Another object is to supply the chemicals in a container that may be completely buried or immersed in soil or in water.

A further object is to supply the chemicals in dry form in a container that is sealed excepting for a member that communicates both with the chemicals and the exterior of the containers and through which moisture may pass very slowly.

An additional object is to supply fertilizer-containing devices that are specifically designed either for use in water or for use in the soil.

Another object is to supply the fertilizing chemicals in a container that will embody the aforementioned features and yet be re-usable.

A further object is to supply the chemicals in a sealed container that either may be discarded after the chemicals have been completely absorbed into the surrounding soil or water or that may be left therein.

This invention possesses many other advantages, and has other objects which may be made more clearly apparent from a consideration of illustrative embodiments of the invention. For this purpose, a few such embodiments are shown in the drawings accompanying and forming part of the present specification. These forms or embodiments will now be described in detail, illustrating the general principles of the invention; but it is to be understood that this detailed description is not to be taken in a limiting sense, since the scope of the invention is best defined by the appended claims.

Figure 1:
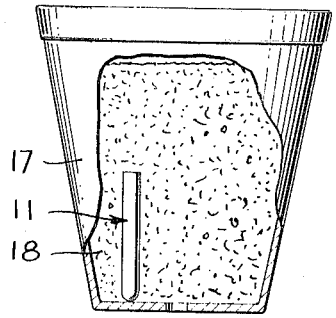
FIGURE 1 shows a pot, partly broken away, containing soil and a completely buried embodiment of one form of the invention.
Figure 2:
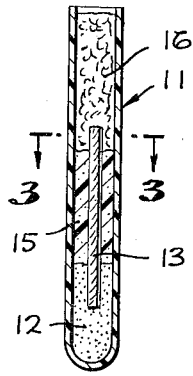
FIG. 2 is a longitudinal section of the chemical-containing fertilizing device shown embedded in the soil in FIG. 1.
Figure 3:
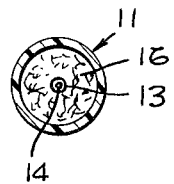
FIG. 3 is a cross section taken on line 3—3 of FIG. 2.

The embodiment of the invention illustrated in FIGS. 1, 2 and 3 includes a container constructed of a material insoluble in water, the material being such that no chemical action of any kind will take place between it and such moisture as may surround it. Glass and plastic or Pyrex are suitable for this purpose.

The chemical that is to be used, preferably in powdered form, is placed in the bottom of a vial 11 as shown at 12 with a tube 13 having a small opening 14, FIG. 3 extending therethrough.

A sealing substance 15, is then placed in the vial on top of the fertilizing chemical and surrounding the tube 13, this tube protruding above the top surface of the sealing material. This may be a capillary tube.

A substance, such as cotton, that will absorb or pass moisture therethrough, is then packed into the vial, as shown at 16 in FIGS. 2 and 3. The tube 13 extends through the sealing material 15 into the moisture-absorbent substance 16, but the top of the tube is completely covered by the moisture-absorbing material.

In using the embodiment of the invention just described, the vial 11 is placed in the soil 18 in which the plant that is to be fertilized has already been, or will shortly be, planted. Thereafter, no fertilizing chemicals need be dissolved in the water that is periodically placed in the soil surrounding the plant, but some of the moisture from this soil gradually seeps into the moisture-absorbing material 16 in the upper portion of the vial, and a portion of it passes through the small longitudinal passageway in the tube 13 and into the chemical 12.

Slowly, over a considerable period of time, the moisture in the surrounding soil 18 will pass back and forth through the absorbent material 16 in the upper portion of the tube 13 in a two-way communication between the chemicals 12 in the bottom of the tube and the soil 18 on the outside of the tube until the chemicals within the tube finally permeate the soil 18 in the pot. In this manner, the fertilizer 12 feeds the plant in the pot at such a slow rate that overfertilization does not occur.

Figure 4:
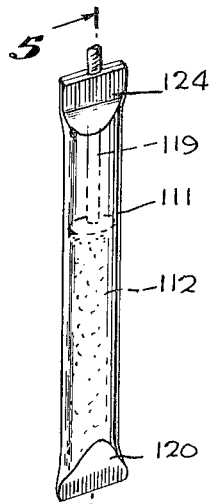
FIG. 4 is a perspective view of an embodiment of my invention primarily intended for use in an aquarium.
Figure 5:
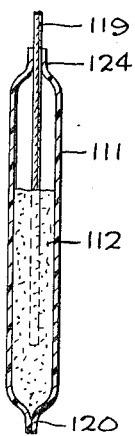
FIG. 5 is a longitudinal section through the device of FIG. 4.
Figure 6:
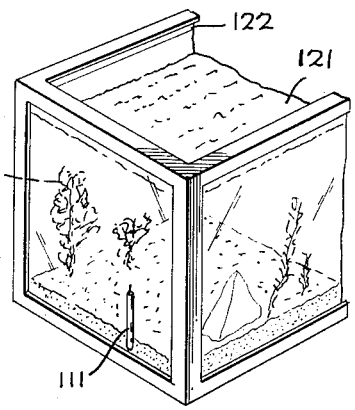
FIG. 6 shows the device of FIGS. 4 and 5 in use in an aquarium containing plants.

In the species of the invention illustrated in FIGS. 4, 5 and 6, the fertilizing chemicals 112 are placed in plastic containers, preferably tubular, of polyethylene, polyester, polypropylene or other heat-sealable material. The container 111 is closed at the bottom end 120, which is so integrally made that the container is initially watertight, or heat-sealed, at the bottom end against moisture penetration. A wick 119 extends into the fertilizing chemical 112 and passes out of the upper end of the container, which is completely sealed around and to the wick as indicated in FIGS. 4 and 5.

When this type of fertilizer-containing device is buried either in the soil or beneath the surface of the water 121 of an aquarium 122, the moisture passes from the exterior of the container through the wick 119 into the tube 111 where it absorbs some of the chemicals 112 into solution, the solution within the container 111 communicating with the water in the aquarium 122 or with the moisture in the soil surrounding the plant until such water or moisture has after a relatively long period of time absorbed the fertilizer from the tube. Plants 123 in the aquarium may be fed proper plant food in this manner without souring the water or poisoning such fish as may be in the aquarium.

Figure 7:
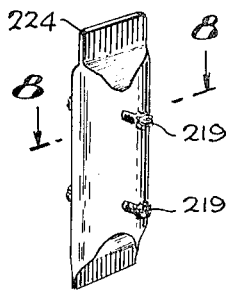
FIG. 7 is a perspective view of another embodiment of the invention.
Figure 8:
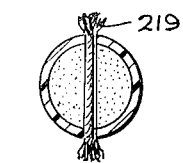
FIG. 8 is a cross section taken on line 8—8 of FIG. 7.

The embodiment illustrated in FIGS. 7 and 8 have much in common with the previously described form. In this embodiment, the fertilizing chemicals are snugly packaged in a tube that is heat-sealed at both ends, and one or more wicks 219 are drawn, as by a needle, through the package, the resilient plastic material fitting snugly around the fibers of the wicks. This arrangement makes it possible for the moisture from the exterior of the device to seep through the chemicals and carry some of them in solution outward through the wicks as the moisture flows back out again in a continuous two-way communication.

Various other embodiments will readily suggest themselves to those familiar with mechanics, and parts may be omitted and replaced by other components performing the same functions, or these functions plus additional functions, and parts may be reversed or transposed and added to—all without departing from the broad spirit of my invention as succinctly set forth in the appended claims.

The inventor claims:

1. A combination for impregnating soil and water with fertilizing chemicals, said combination including: a vial closed at the bottom end; fertilizing chemicals in the lower portion of said vial; an elongated moisture-transmitting element having one end embedded in said chemicals; a sealing mass over said chemicals and surrounding said element; and moisture-absorbent material in said tube above said mass and surrounding the other end of said element.

2. The combination set forth in claim 1 in which said material acts as a closure for said vial.

3. The combination set forth in claim 1 in which said element is a thin tube.

4. The combination set forth in claim 1 in which said element is a wick.

5. A combination for impregnating soil and water with fertilizing chemicals, said combination including: a tube of heat-sealable material completely sealed at its lower end; fertilizing chemicals in said tube; and a wick having its lower end embedded in said chemicals and its upper end extending from the upper end of said tube, said upper end sealed around said wick.

6. A combination for impregnating soil and water with fertilizing chemicals, said combination including: a heat-sealable tube sealed at both ends; fertilizing chemicals within said tube; and at least one wick extending through said tube whereby moisture from the exterior of the tube may enter and leave said chemicals.

References Cited by the Examiner
UNITED STATES PATENTS

| | | | |
|---|---|---|---|
| 1,971,390 | 8/1934 | Yahres | 47—48.5 |
| 2,082,712 | 6/1937 | McIvor | 43—131 |
| 2,458,027 | 1/1949 | Quist | 47—38.1 X |
| 2,491,124 | 12/1949 | Martin | 47—38.1 X |
| 2,931,140 | 4/1960 | Laffler et al. | 47—48.5 |

ABRAHAM G. STONE, *Primary Examiner.*

ROBERT E. BAGWILL, *Examiner.*